United States Patent
Scrivano et al.

(10) Patent No.: US 12,346,717 B2
(45) Date of Patent: Jul. 1, 2025

(54) VIRTUAL MACHINE STORAGE SYSTEM FOR DUPLICATION AVOIDANCE

(71) Applicant: Red Hat, Inc., Raleigh, NC (US)

(72) Inventors: Giuseppe Scrivano, Spezzano della Sila (IT); Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 551 days.

(21) Appl. No.: 17/727,350

(22) Filed: Apr. 22, 2022

(65) Prior Publication Data

US 2023/0342173 A1    Oct. 26, 2023

(51) Int. Cl.
*G06F 9/455*    (2018.01)
*G06F 16/13*    (2019.01)
*G06F 16/14*    (2019.01)

(52) U.S. Cl.
CPC ........ *G06F 9/45558* (2013.01); *G06F 16/137* (2019.01); *G06F 16/152* (2019.01); *G06F 2009/45583* (2013.01)

(58) Field of Classification Search
CPC .. G06F 9/45558; G06F 16/137; G06F 16/152; G06F 2009/45583
See application file for complete search history.

(56) References Cited

U.S. PATENT DOCUMENTS

| | | | |
|---|---|---|---|
| 9,424,058 B1 | 8/2016 | Wasson et al. | |
| 9,501,545 B2 | 11/2016 | Woodward et al. | |
| 10,073,656 B2 | 9/2018 | Zhe Yang et al. | |
| 10,678,448 B2 | 6/2020 | Jain et al. | |
| 11,055,006 B1 | 7/2021 | Chen et al. | |
| 11,061,711 B2 | 7/2021 | Tsirkin | |
| 2006/0224816 A1* | 10/2006 | Yamada | G06F 12/1036 711/6 |
| 2007/0043929 A1* | 2/2007 | Safford | G06F 12/1063 711/E12.064 |

OTHER PUBLICATIONS

Lee et al., "Live Deduplication Storage of Virtual Machine Images in an Open-Source Cloud", Dept of Computer Science and Engineering, The Chinese University of Hong Kong, Hong Kong, Dec. 2011, 21 pages https://www.researchgate.net/publication/221461653_Live_Deduplication_Storage_of_Virtual_Machine_Images_in_an_Open-Source_Cloud.

* cited by examiner

*Primary Examiner* — Wissam Rashid
(74) *Attorney, Agent, or Firm* — Womble Bond Dickinson (US) LLP

(57) ABSTRACT

Systems and methods for duplication avoidance are disclosed. In one implementation, a VM can receive a request to perform a file access operation with respect to a file and determine a hash value corresponding to a content of the file. The VM can search the file identified by the hash value in in a host file system. Responsive to failing to find the hash value in the host file system, the VM can search the hash value in a guest file system of the VM and responsive to finding the file identified by the hash value in the guest file system, can perform the file access operation with respect to the file.

17 Claims, 6 Drawing Sheets

ITH Table 402

| 404 | 406 |
|---|---|
| Directory1/subdirectory1/filename1 | kh5mphfg |
| Directory2/subdirectory2/filename2 | p9a8r0ut |
| Directory3/subdirectory3/filename3 | ormqabo6 |

FIG. 4A

HTC Table 412

| 406 | 414 |
|---|---|
| kh5mphfg | Content-location-indicator-1 |
| p9a8r0ut | Content-location-indicator-2 |
| ormqabo6 | Content-location-indicator-3 |

FIG. 4B

VIRTUAL MACHINE STORAGE SYSTEM FOR DUPLICATION AVOIDANCE

TECHNICAL FIELD

The disclosure is generally related to virtualization systems, and is more specifically related to a virtual machine system for duplication avoidance.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which:

FIG. 4A is a block diagram of an identifier-to-hash (ITH) table, in accordance with one or more implementations of the present disclosure;

FIG. 4B is a block diagram of a hash-to-content (HTC) table, in accordance with one or more implementations of the present disclosure;

DETAILED DESCRIPTION

Figure 1:
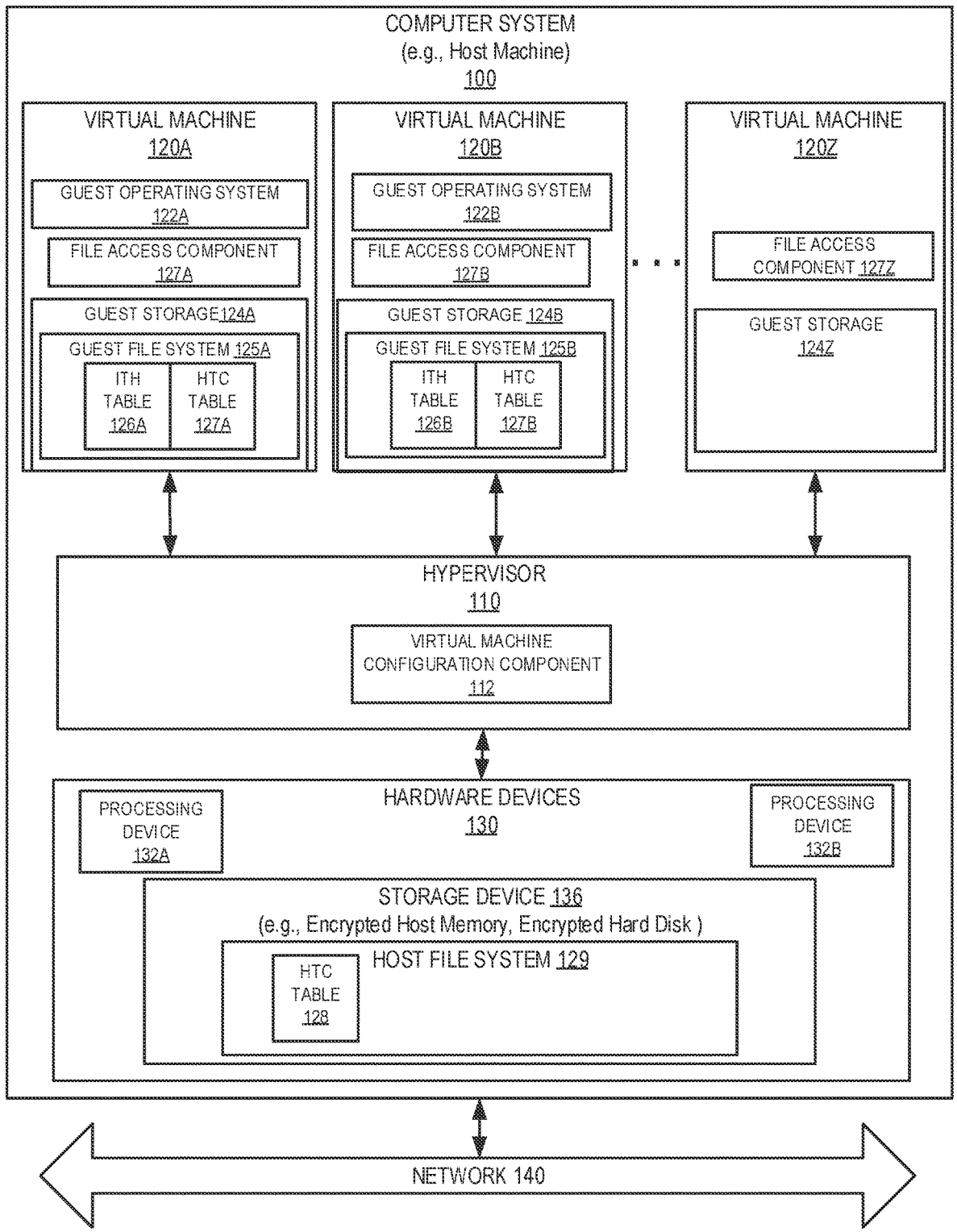
FIG. 1 depicts a high-level diagram of an example system architecture operating in accordance with one or more implementations of the present disclosure.

Implementations of the disclosure are directed to virtual machine systems for duplication avoidance. In particular, the various implementations discussed herein provide mechanisms for reducing data duplication in virtualization systems hosting multiple virtual machines (VMs).

Virtualization is a computing technique that improves the utilization of computer systems, and can be realized through the implementation of virtual machines (VMs). A VM is a portion of software that, when executed on appropriate hardware, creates an environment allowing the virtualization of a physical computer system (e.g., a server, a mainframe computer, etc.). The physical computer system can be referred to as a "host computer system" or a "host machine," and the operating system of the host machine is typically referred to as the "host operating system." A VM can operate as a self-contained platform, executing its own "guest" operating system and software applications. In some instances, software on the host machine known as a "hypervisor" (or a "virtual machine monitor") can manages the execution of one or more VMs, providing a variety of functions such as virtualizing and allocating resources for the VMs. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines (VMs).

In some virtualization systems, there can be multiple VMs running on the same host machine or within the same cluster of hosts. Each VM in such a system can have the same or similar configurations as the other VMs, and thus could have many operating system and configuration files (e.g., executables, libraries, setting preferences, etc.) that could be shared between them. However, in such cases, to permit one VM to modify one of the shared files (e.g., a configuration file) without interfering with the access and use of the same file by other VMs, the file can be duplicated (i.e., a copy of that file can be made for use by that VM).

Deduplication schemes that mitigate duplication of data can be based on content addressable storage (CAS) techniques, which involve storing and retrieving data based content instead of location. Both host systems and the VMs running on them can use CAS systems. CASs use unique identifiers (e.g., a hash function of content) to identify particular files. CAS systems can assign a content address, which is a unique identifier (e.g., a hash or checksum) calculated based on content, to each data object (e.g., file) in the system. Accordingly, CAS systems can be used to map a hash of file content to an identifier of the physical location of the file. To access or retrieve the data in a CAS system, applications can use the content addresses to find the desired files. In many instances, because a file's address is based on the content of that file, data duplication can be reduced or avoided altogether. For example, when there is an attempt to store identical file to one that already exists, instead of storing an identical file with the same address, the CAS system can create a pointer to the original file instead.

In such CAS systems, VM guests (i.e., virtualized operating systems running in the virtual environment of the VM) can map a file identifier (e.g., an address, path, file name, etc.) to a content hash. For example, the VM can have a table, stored in a virtual storage device of the VM, which translates such a file identifier to a hash (i.e., an identifier-to-hash (ITH) table). For example, an ITH table can be defined by a data structure including one or more records with each record mapping an identifier of a file to a corresponding hash value. Using the content hash, the VM can access the file's content by looking up the hash in another table (e.g., a hash-to-content (HTC) table), which maps the hash to an identifier of the physical location of the content of the file. Analogously to the ITH table, an HTC table can be defined by a data structure including one or more records with each record mapping a hash value to a corresponding content location. Thus the VM contains both the ITH and the HTC table along with the contents of the file in its virtual storage.

However, when the same file is present or is being used by multiple VMs using CAS systems, this results in each VM having its own copy of that file in its virtual storage. Consequently, because the VMs' virtual storage is a virtualized representation of hardware storage (e.g., a host storage device) of the host system, having multiple versions of the file within each VM's virtual storage leads to data duplication and unnecessary redundancy resulting in inefficient use of data storage resources. The presence of the same file across multiple VMs can result in redundant data duplication and storage inefficiencies that can be addressed through data deduplication techniques that removes duplicate copies of repetitive data to enable more data to be stored within a data storage device. Data deduplication can involve identifying portions of data that are stored within a data storage resource, comparing them to other portions stored within the data storage resource and replacing redundant portions with small references that point to one of the other redundant portions, to reduce the amount of storage resources consumed to store the data.

In some systems, to eliminate the need of having duplicate copies of data on each of the VMs, both of the ITH table and HTC table can be located solely on host storage that is accessible by all of the VMs (i.e., the host file system is shared with all of the VM guests). Such systems can address the problem of data duplication not only with respect to the data representing contents of the file (e.g., when VM-specific copies of a file are created and stored on the respective VM's virtual storage) but also with respect to the data representing file mapping records in respective HTC tables (e.g., when a file mapping record for a file is moved from an HTC table stored solely on host storage to an HTC table stored in the corresponding VM's virtual storage) However, in systems where both of the ITH table and HTC tables are located exclusively on the host file system and shared with all of the VM guests, data being changed in one of the tables by one of the VMs, can cause errors for other VMs since the resulting outcome would be unexpected for VMs that were not initiators of that change. For example, an error relating to inconsistent mapping could arise if one VM, using the tables stored exclusively on the host storage, maps a certain file path (e.g., via its corresponding hash) to a particular file content in a corresponding location, and then another VM attempts to map the same file path to a different file content in a different corresponding location. Regardless of whether the second VM is permitted to change the mapping, at least one of the VMs will have an intended path-to-content-location mapping that does not correspond to that which is recorded in the table(s) stored on the host storage.

Furthermore, in some systems, deduplication of data can be performed on the host level. For example, a search can be performed (e.g., by a hypervisor) on the host storage (e.g., memory device) for identical portions of data. The duplicate identical (i.e., redundant) portions of the data can be removed and replaced on the host storage with small (i.e., consuming less memory) references that point to one of the other identical portions of data. However, with a large number of VMs running or with each additional VM that is initialized, a large amount of processing resources becomes necessary to perform the search to identify identical data portions on the host storage that correspond to identical units of data (e.g., files) in the virtual storage of each of the VMs. Additionally, such naive deduplication approaches can lead to security risks. For example, naive deduplication approaches can permit a VM to determine a likelihood of a piece of data existing on other VMs. A VM can infer such a likelihood by making a change in the file system that should initiate a deduplication process and observe whether or not, as a result of that change, the host processing resources are reduced (thereby indicating that it is likely a result of removing duplicate portions of data identical to that created by the change).

Aspects of this disclosure address the above and other deficiencies by providing a mechanism for avoiding data duplication. In accordance with implementations of this disclosure, a virtualization system can include a CAS system for storing data on both of the virtual storage of its VMs as well as on the storage of the host. For example the CAS system of a VM can employ a file system that includes both an ITH table and a HTC table. The ITH table can contain entries that include a file's identifier, such as a file path (including its name), as well as a corresponding hash of the file content. In this manner, each file identifier in the ITH table can be mapped to a corresponding hash. The HTC table can contain entries that include the hash as well as the corresponding content location of the file. In this manner, the HTC table can map each hash to a corresponding file content location.

Furthermore, the host storage can also employ a file system that contains an HTC table. The HTC table on the host storage can include entries or records associated with data that is shared by multiple VMs. In contrast, the HTC tables of the VMs can include entries or records associated with data that is not shared between VMs and is private to the VM on the storage of which it is located. The portion of the host file system containing the HTC table can be "exposed" to (i.e., available to be accessed by) the VMs on the host system.

Accordingly, in some implementations, to access a file's content, a VM can determine the file's hash (i.e., a hash value corresponding to the content of the file) using the ITH table of the virtual file system. Thereafter, instead of referring to the HTC table in the virtual file system as in a regular CAS system, the VM can refer directly to the HTC table stored in the file system of the host storage. Thus, the VM can use the file's hash to search the HTC table in the host storage in an attempt to perform a file access operation with respect to the file and access the file contents. If the file is a shared file that is accessible by or used by multiple VMs, its content location can be recorded in an entry in the HTC table on the host storage. Accordingly, the VM can find and access the file contents by searching for the file identified by the hash value in the host file system (e.g., by looking up the file hash in the HTC table to find the corresponding location of the file contents).

If upon searching the HTC table on the host storage, the VM is unable to find the hash of the relevant file (i.e., unable to find the file identified by the hash value), the VM can determine that the file is not a shared file and proceed to search the HTC table located in the virtual storage of the VM for the hash of the file. The absence of entries in the HTC table, in the host storage file system, containing the file hash as well as its corresponding file content location can be an indication that the file is a file that is exclusive to (i.e., can only be accessed by) one VM. Accordingly, upon failure to find the file associated with the hash value in the host storage HTC table, the VM can search the HTC table in the virtual storage of the VM and locate the corresponding file contents to be accessed. Furthermore, the VMs and host can add shared files to the host file system along with their corresponding hashes and content locations by adding entries to the HTC table stored in the host file system on the host storage.

In this manner duplication of shared files used by multiple VMs can be avoided by having the shared file content locations be stored along with their corresponding hashes in the HTC tables on the host storage. Accordingly, the VMs need not have a copy of each of the shared files in virtual storage and need not record the location of the shared files' content in the HTC tables stored in the virtual storage of the VMs. Accordingly, implementations of the present disclosure reduce the amount of storage resources used to store data (e.g., files) that is shared between multiple VMs and increase security by reducing the ability of a VM to infer the presence of a file on other VMs based on processing resource consumption caused by deduplication operations. These and other benefits of the implementations of the present disclosure can be understood in more detail with reference to FIG. 1.

FIG. 1 depicts an illustrative architecture of elements of a computer system 100, in accordance with an implementation of the present disclosure. It should be noted that other architectures for computer system 100 are possible, and that the implementation of a computer system utilizing embodiments of the disclosure are not necessarily limited to the specific architecture depicted. Computer system 100 can be a single host machine or multiple host machines that may be arranged in a homogenous or non-homogenous group (e.g., cluster system, grid system, or distributed system). Computer system 100 can include a rackmount server, a workstation, a desktop computer, a notebook computer, a tablet computer, a mobile phone, a palm-sized computing device, a personal digital assistant (PDA), etc. In the implementation depicted in FIG. 1, computer system 100 can include hypervisor 110, virtual machines 120A-Z, hardware devices 130, and network 140.

Hypervisor 110 can also be known as a virtual machine monitor (VMM) and can provide virtual machines 120A-Z with access to one or more features of hardware devices 130.

Hypervisor 110 can run directly on the hardware of computer system 100 (e.g., bare metal hypervisor) or can run on or within a host operating system (not shown). In the example shown in FIG. 1, hypervisor 110 can include a virtual machine configuration component 112. Virtual machine configuration component 112 can enable hypervisor 110 to configure a virtual machine to access the virtual data storage associated with that virtual machine as well as to access the data storage of the host machine. In some implementations, the virtual data storage can be encrypted data storage that is accessible only to the virtual machines without being accessible to the hypervisor managing the virtual machines. Hypervisor 110 can manage virtual machines 120A-Z and provide them with access to system resources. Each of the virtual machines 120A-Z may be based on hardware emulation and may support para-virtualization, operating system-level virtualization, or a combination thereof. Virtual machines 120A-B can have the same or different types of guest operating systems 122A-B and virtual machine 120Z can be without a guest operating system.

In some implementations, guest operating systems 122A-B can be any program or combination of programs that are capable of managing computing resources of a virtual machine. Guest operating systems 122A-B may manage the execution of multiple processes that provide one or more computing services.

In the implementations of this disclosure, guest storage 124A-Z can be any virtual data storage, logical data storage, physical data storage, other storage, or a combination thereof for storing, organizing, or accessing data capable of operating as a content addressable storage (CAS) system. Guest storage 124A-B may each correspond to a portion of storage device 136 that has been designated for use by the respective virtual machine. Guest storage 124A-B may function as volatile data storage or non-volatile data storage as discussed below in regards to storage device 136. In some implementations, guest storage can include a guest file system 125A employed as a CAS system.

The guest file system 125A-B can include one or more identifier-to-hash (ITH) tables 126A-B and one or more hash-to-content (HTC) tables 127A-B forming the CAS system. In some implementations, each ITH table 126A-B can contain entries that include a file's identifier, such as a file path (including its name), and can contain corresponding entries with the hash of the file content. In this manner, each file identifier in the ITH table 126A-B can be mapped to a corresponding hash. Accordingly, each ITH table 126A-B can be represented as a data structure including one or more records with each record mapping an identifier of a file to a corresponding hash value. The HTC tables 127A-B can each contain entries that include the hash of the file as well as corresponding entries that contain the corresponding location of the content of the file. In this manner, the HTC tables 127A-B can map each hash to a corresponding file content. Thus, each of the HTC tables 127A-B can be represented by a data structure including one or more records with each record mapping a hash value to a corresponding content location. Examples of an ITH table 126A-B and HTC table 127A-B are described in more detail below with reference to FIGS. 4A-B.

In some implementations of the present disclosure, hardware devices 130 can provide hardware functionality for performing computing tasks related to the accessing, processing, creating, or editing data by the VMs 120A-Z. Hardware devices 130 can include one or more storage devices 136 (also referred to herein as "host storage") and one or more processing devices 132A, 132B, or combination thereof. One or more of these hardware devices can be split up into multiple separate devices or consolidated into one or more hardware devices. Some of the hardware devices shown can be absent from hardware devices 130 and can instead be partially or completely emulated by executable code.

Storage device 136 can include volatile or non-volatile data storage devices. Volatile data storage devices (e.g., non-persistent storage) can store data for any duration of time but can lose the data after a loss of power. Non-volatile data storage devices (e.g., persistent storage) can store data for any duration of time and can retain the data beyond a loss of power. In one example, storage device 136 can include one or more registers (e.g., processor registers) or memory devices (e.g., main memory, auxiliary memory, adapter memory). In another example, storage device 136 can include one or more mass storage devices, such as hard drives (hard disk drive (HDD)), solid-state storage (e.g., Solid State Drives (SSD), flash drive), other data storage devices, or a combination thereof. In a further example, storage device 136 can include a combination of one or more registers, one or more memory devices, one or more mass storage devices, other data storage devices, or a combination thereof that may or may not be arranged in a cache hierarchy.

Processing devices 132A and 132B can include one or more processors that are capable of accessing storage device 136 and executing instructions of guest program 123. Processing devices 132A and 132B can be a single core processor that is capable of executing one instruction at a time (e.g., single pipeline of instructions) or can be a multi-core processor that simultaneously executes multiple instructions. The instructions can encode arithmetic, logical, or I/O operations and can be used to execute a cryptographic function that performs encryption or decryption of data within storage device 136. Processing devices 132A-B and storage device 136 can interact with one another to store data in an encrypted form and provide access to the stored data in either an encrypted form or unencrypted form based on the context of the process attempting to access the data (e.g., VM process or hypervisor process).

In implementations of the present disclosure, the host storage device 136 can include a host file system 129 at least a portion of which is directly accessible by the VMs running on the computer system 100. The host file system 129 can include a host HTC table 128 (i.e., an HTC table located on the host storage). Portions of the file system 129 on the host storage device 136 can be encrypted or otherwise inaccessible by any or by some subset of the VMs running on the computer system 100. For example, one or more of the hardware devices 130 can execute a cryptographic function to encrypt or decrypt the data before, during, or after it is stored in the file system 129 of the storage device 136. The cryptographic function can be any function that is suitable for use in a standardized or proprietary cryptographic protocol and can involve one or more mathematical manipulations of content data. The cryptographic function can map data of an arbitrary size to a bit sequence of a fixed size or variable size. In one example, the cryptographic function can be a cryptographic function that takes a content message as input and outputs a value, which can be referred to as cipher text, a digest, hash, or a message digest. The cryptographic function can include a private key cryptographic function a public key cryptographic function, other cryptographic function, or a combination thereof. In one example, one or more of the hardware devices 130 can execute the cryptographic function without providing higher-level executable code (e.g., guest operating system 122A-B, hypervisor 110, or host operating system) access to the cryptographic function, cryptographic input, or a combination thereof.

In some implementations one or more VMs 120A-Z can store files (by indicating the locations of their contents in respective entries of HTC table 128) in the host file system 129 on a physical storage device 136 of a host computer system 100. In one implementation, a VM 120A, can receive a request to access a file that can be one of the files stored in a location referenced in an entry of HTC table 128 or HTC table 127A. Each of the VMs 120A-B can index the files by each file's respective content hash (i.e., index the files using the corresponding hashes of the content of each file) and organize the files in corresponding entries in the tables of the guest file system 125A-B and in the tables of the host file system 129. For the VMs 120A-B to be able to add or read files at the file content locations referenced in HTC table 128, the hypervisor 110 can provider access for the VMs 120A-B to a portion of the host file system 136 containing the HTC table 128. In this manner, only a portion of the file system 136 can be exposed to some of the VMs while the remainder can remain encrypted and otherwise inaccessible by any of the VMs 120A-Z directly.

Using the file identifier and the entries in the identifier-to-hash (ITH) table 126A the VM 120A can determine a hash value corresponding to the content of the file (i.e., the hash of the file contents) and associated with the identifier of the file. The VM 120A determining the hash value corresponding to the content of a file and associated with the identifier of the file can include finding an entry containing the file identifier and an entry with a corresponding hash value of the file content in a guest ITH table 126A stored in the guest file system 125A of the VM 120A. Further, using the hash value for the file from the ITH table 126A, the VM 120A can search the hash value in the HTC table 128 stored in the host file system 129 to determine the location of the corresponding file content if an entry indicating the location is present there.

In some instances, the VM 120A can fail to find the file identified by a particular has value in the host file system. For example, if the VM 120A fails to find the hash value in the HTC 128 table stored in the host file system 129 (i.e., indicating that the file is not a shared file stored in the host file system 129), the VM 120A can, in response, search the hash value in the HTC table 127A stored in the guest file system 125A of the VM. Thus, the VM 120A can access the content of the file using the second HTC table where the file's hash and the file content location can be recorded in corresponding entries.

In some instances, the VM 120A can succeed in finding the file identified by a particular has value in the host file system. For example, if the VM 120A does find the hash value of the file in HTC table 128 stored in the host file system 129 (i.e., indicating that the file is a shared file), the VM can access the content of the file using the HTC table 127A stored in the guest file system 125A, where the file's hash and the file content location can be recorded in corresponding entries.

In some implementations, the VMs 120A-Z can be prohibited from accessing any portion of the host storage file system 129 directly. Furthermore, the VMs 120A-B that have been given access (e.g., by the hypervisor 110) to HTC table 128 on the host storage device 136, can be prohibited from removing or modifying any entries in the HTC table 128 (i.e., so as not to interfere with data and files being used by other VMs 120A-B). However, in some implementations, VMs can have other permissions and can, for example, add entries in the HTC table 128 stored in the host file system 129 for each new file to which more than one VM 120A-B have access.

In some implementations, the computer system 100 together with its constituent hardware devices 130 can be communicatively connected to network 140. Network 140 can be a public network (e.g., the internet), a private network (e.g., a local area network (LAN) or wide area network (WAN)), or a combination thereof. In one example, network 140 can include a wired or a wireless infrastructure, which can be provided by one or more wireless communications systems, such as a wireless fidelity (WiFi) hotspot connected with the network 140 and/or a wireless carrier system that can be implemented using various data processing equipment, communication towers, etc.

Figure 2:
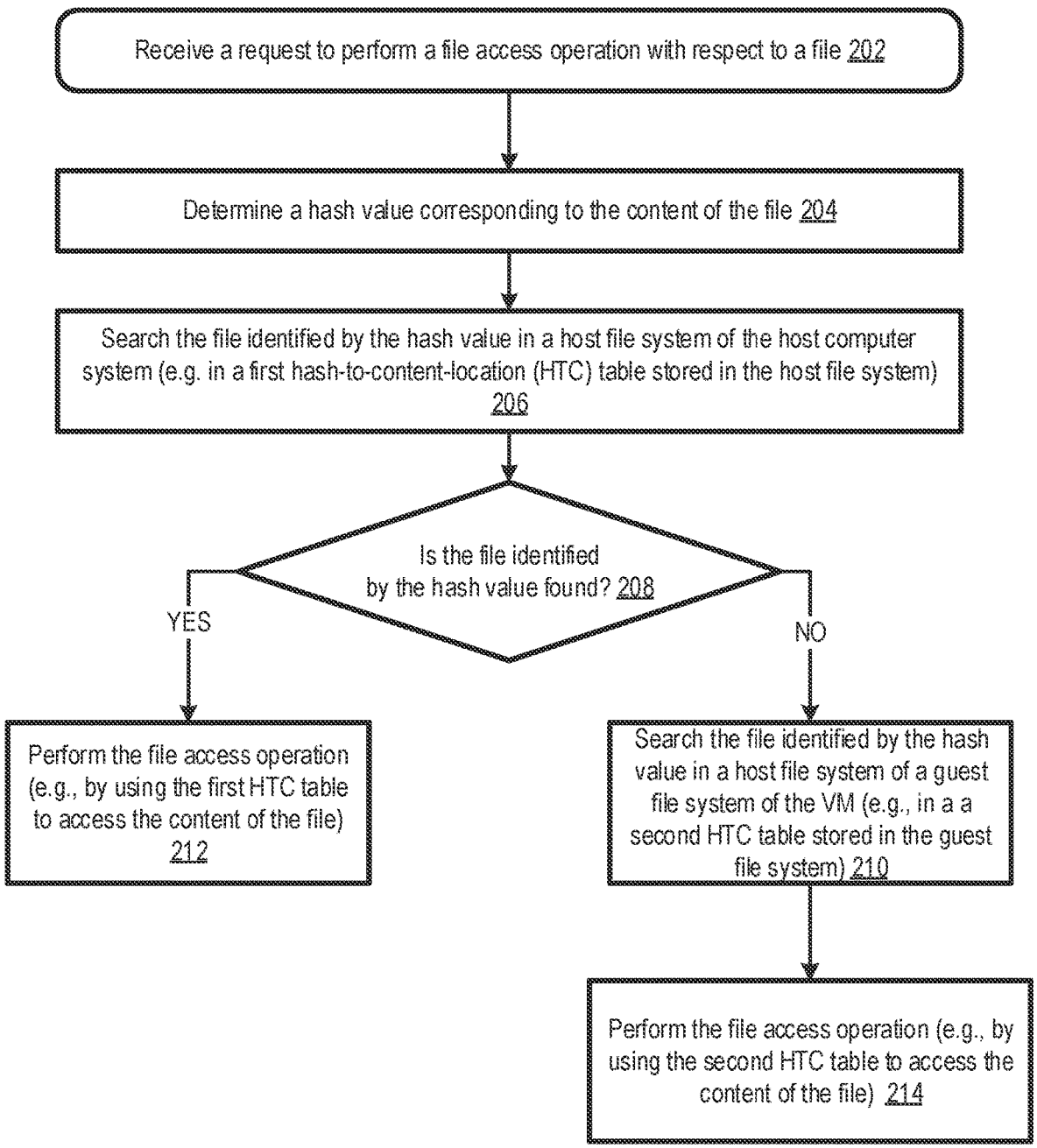
FIG. 2 is a flow diagram of an example method of duplication avoidance, in accordance with one or more implementations of the present disclosure.

FIG. 2 is a flow diagram of an example method of duplication avoidance, in accordance with one or more aspects of the present disclosure. Method 200 can be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations can be performed by one or more processors of a computer system (e.g., the computer system 100 of FIG. 1) implementing the method. In an illustrative example, method 200 may be performed by a single processing thread. Alternatively, method 200 can be performed by two or more processing threads, each thread implementing one or more individual functions, routines, subroutines, or operations of the method. In an illustrative example, the processing threads implementing method 200 can be synchronized (e.g., using semaphores, critical sections, or other thread synchronization mechanisms). Alternatively, the processing threads implementing method 200 can be executed asynchronously with respect to each other. Therefore, while FIG. 2 and the associated description lists the operations of method 200 in certain order, various implementations of the method can perform at least some of the described operations in parallel or in arbitrary selected orders.

Method 200 can begin at block 202. In some implementations, at block 202, the processing logic (e.g., the processing logic that generates or represents a VM) can receive, a request to access a file. For example, the processing logic can receive, at block 202, a request to perform a file access operation with respect to the file. The file and its contents can be accessed at a location recorded in an entry of an HTC table 127A, 128 (e.g., an HTC table either in the host file system 129 or guest file system 125A). At block 204, the processing logic can determine a hash value corresponding to the content of the file where the hash value can also be associated with an identifier of the file. In one example, the hash value can be a hash or a checksum of the file contents.

At block 206, the processing logic can search for the file identified by the hash value in the host file system of a host computer system. For example, block 206, the processing logic can search the hash value (i.e., the hash value of the content of the file) in a hash-to-content-location (HTC) table stored in a host file system (e.g., HTC table 128 on host file system 129). Then, at block 208, the processing logic can determine whether or not the file identified by the hash value is found in the host file system based on whether or not the hash value is found in that HTC table.

In some implementations, in response to failing file identified by the hash value in the host file system (e.g., by failing to find the hash value in the HTC table stored in the host file system), at block 210, the processing logic can search the file identified by the hash value in the host file system. For example, at block 210, the processing logic can search the hash value in a second HTC table stored in a guest file system of the VM (e.g., HTC table 127A in guest file system 125A on VM 120A). The processing logic can then, at block 214, use that other HTC table stored in the guest file system of the VM to determine the file content location and perform a file access operation to access the content of the file. Alternatively, if it is determined at block 208 that the hash value is found in the HTC table on the host file system, in response to finding the hash value there, the processing logic can, at block 212, determine the file content location and perform a file access operation to access the content of the file using the HTC table on the host file system. Some of these operations can be understood in more detail with reference to FIG. 3.

Figure 3:
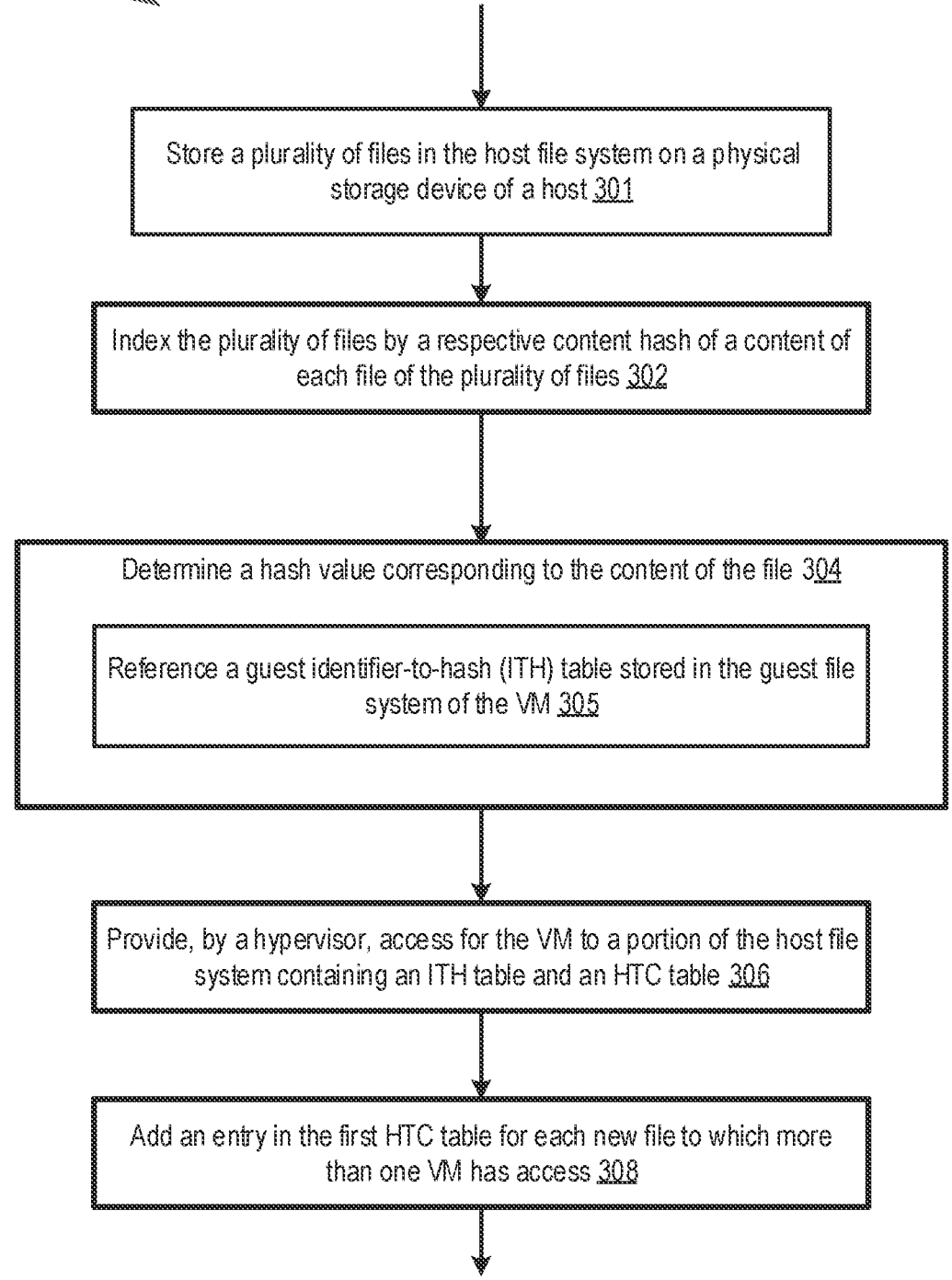
FIG. 3 is a flow diagram of an example method of duplication avoidance, in accordance with one or more implementations of the present disclosure.

FIG. 3 is a flow diagram of an example method of duplication avoidance, in accordance with one or more aspects of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computer system 100 of FIG. 1) implementing the method. In an illustrative example, method 300 can be performed by a single processing thread. Alternatively, method 300 can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders.

Events and operations occurring within the various blocks of method 300 can occur, in some implementations, in any order as well as together with or instead of events and operations occurring within the various blocks of method 200 described earlier. For example, method 300 can begin at block 301. At block 301, the processing logic (e.g., the processing logic that generates or represents a VM) can store files in the host file system on a physical storage device of a host (e.g., in host file system 129 on storage device 136 on host computer system 100). Further, the processing logic can, at block 302, index the files by a respective content hash of the content of each file. In some implementations, the events and operations of blocks 301 and 302 can occur, for example, before the events and operations occurring at block 202 of method 200.

In other example implementations, the processing logic can, at block 304, determine the hash value corresponding to the identifier of a file that has been requested to be accessed (e.g., the request of block 202). For example, at block 305, the processing logic can use a virtual identifier-to-hash (ITH) table (e.g., ITH table 126A) stored in the guest file system of the VM that received the request to access the file. Using the guest ITH table can include finding an entry containing the file identifier and an entry with a corresponding hash value of the file content in the ITH table stored in the guest file system of a VM (e.g., the ITH table 127A stored in the guest file system 125A of the VM 120A of computer system 100).

To perform some of the operations mentioned earlier, in some implementations, at block 306, the processing logic can provide (e.g., by a hypervisor 110) access for one or more VMs to a portion of the host file system. For example, access can be provided to the portion of the host file system containing a hash-to-content-location (HTC) table (e.g., HTC table 128 stored in the host file system 129 on the host storage device 136) where the content of files shared between multiple VMs is stored. In some implementations, the processing logic can, at block 306, prohibit one or more VMs from accessing one or more portions of the host storage file system directly. Furthermore, the processing logic can VMs 120A-B that have been given access (e.g., by the hypervisor 110) to HTC table 128 on the host storage device 136, can prohibit the VMs that have been given access to the HTC table stored in the host file system from removing or modifying any entries in that HTC table (i.e., so as not to interfere with data and files being used by other VMs). Additionally, in some implementations, the processing logic can (e.g., by VMs that have been given other permissions), at block 3038 add entries in the HTC table stored in the host file system (e.g., HTC table 128 stored in the host file system 129) on the host storage device 136) for each new file to which more than one VM 120A-B can have access. These and other aspects of the present disclosure can be better understood with reference to FIGS. 4A-4B.

FIG. 4A is a block diagram of an identifier-to-hash (ITH) table 402, in accordance with one or more implementations of the present disclosure. In some implementations, the ITH table 402 can be employed as part of one or more file systems (e.g., guest file system 125A, host file system 129). In the depicted example, the ITH table 402 can contain entries that include a file's identifier 404, such as a file path (including its name), as well as an associated hash value 406 (also referred to as "hash") corresponding to the file content. Each file can have an associated pair of entries with an identifier 404 and a hash 406 respectively. In some implementations, the hash 406 can be a checksum or other value representative of the content of the file. In this manner, each file identifier 404 in the ITH table 402 can be mapped to a corresponding hash 406.

FIG. 4B is a block diagram of a hash-to-content (HTC) table 412, in accordance with one or more implementations of the present disclosure. In some implementations, the HTC table 412 can be employed as part of one or more file systems (e.g., guest file system 125A, host file system 129). For example, one HTC table 412 can, be on the guest file system of a VM and contain one set of files and respective file content location indicators 414 and another HTC table 412 can be on the host file system and contain another set of files and respective file content location indicators 414 (in each case along with their respective hash values 406). A file content location indicator 414 can refer to a physical location at which the content of a file can be accessed. In some implementations, the HTC table can contain entries that include the hash 406 as well as the corresponding file content location indicator 414 of the file. In this manner, the HTC table can map each hash to a location of corresponding file content that can be accessed.

Figure 5:
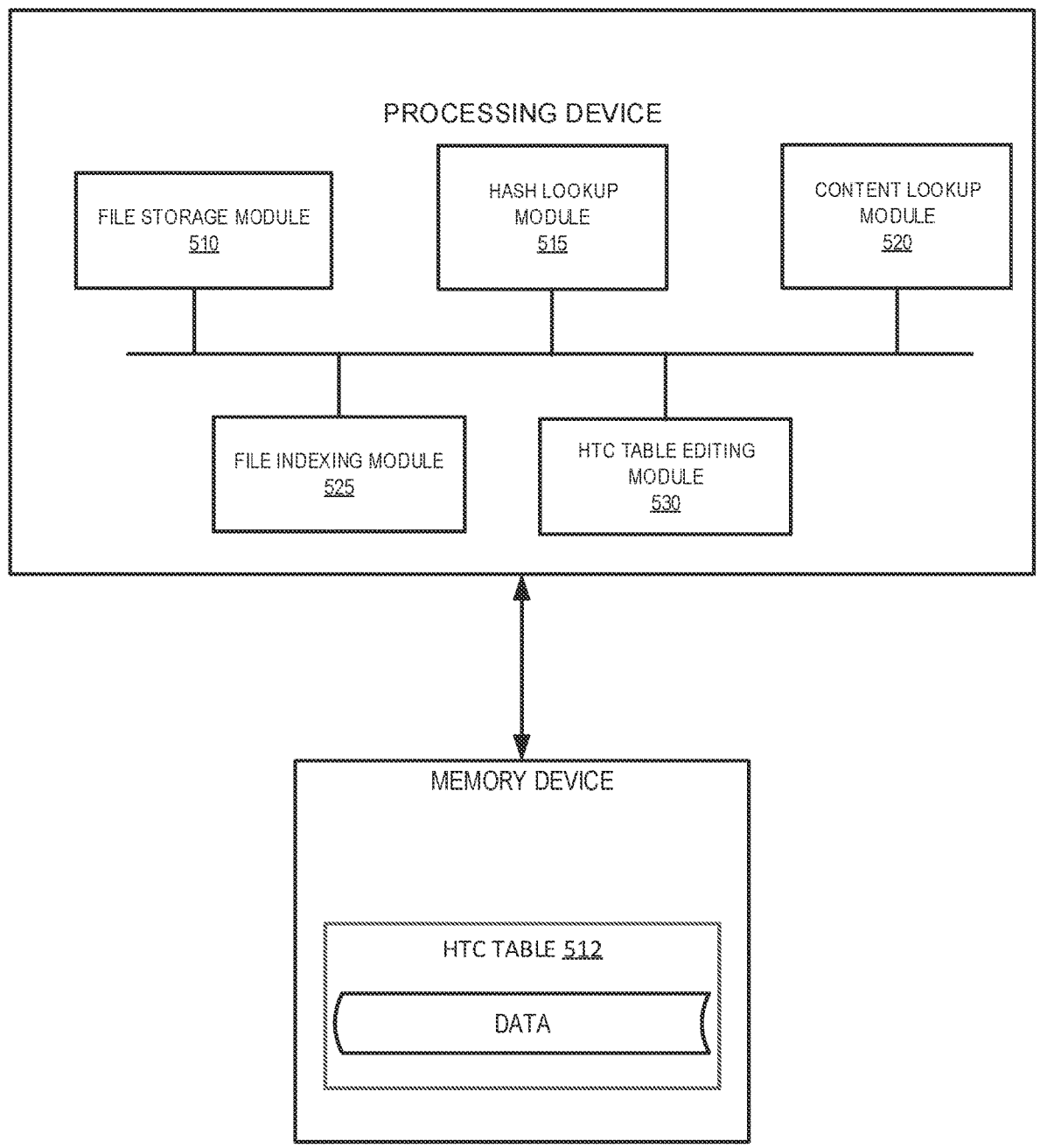
FIG. 5 depicts a block diagram of a computer system operating in accordance with one or more implementations of the present disclosure.

FIG. 5 depicts a block diagram of a computer system 500 operating in accordance with one or more aspects of the present disclosure. Computer system 500 may be the same or similar to computer system 100 of FIG. 1 or computer system 700 of FIG. 7 and may include one or more processing devices and one or more memory devices. In the example shown, computer system 500 may include an access enablement module 510, an indication receiving module 520, and duplicate storage updating module 530.

In some implementations, file storage module 510 may enable the VMs and the hypervisor to store files in the guest file systems and the host file systems. The file storage module 510 can cause the creation of the ITH and HTC table 512 on either the guest storage or the host storage. Further the file storage module can also store files along with their respective content within the HTC tables 512. Accordingly, the file indexing module 525 can index the files by their respective hash values within the ITH tables and HTC tables each of which can contain entries of hash values corresponding to particular files.

The hash lookup module 515 can determine a hash value corresponding to the content of a file or corresponding to an identifier of a file (e.g., when a request perform a file access operation is received). In some implementations, hash lookup module 512 can search the hash value in an ITH table as well as in an HTC table 512 stored in a host file system and in a guest file system of the VM. The content lookup module 520 can use the second HTC table to determine the location of a file's content and access a content of the file via the association of a hash value with the content of the file. The HTC table editing module 530 can add, modify and remove entries in the HTC table and control modification of the table by VMs. In some implementations the HTC editing module can control the access and edit permissions of the VMs so that they are limited to only adding entries into the HTC tables for each new file to which more than one VM has access.

Figure 6:
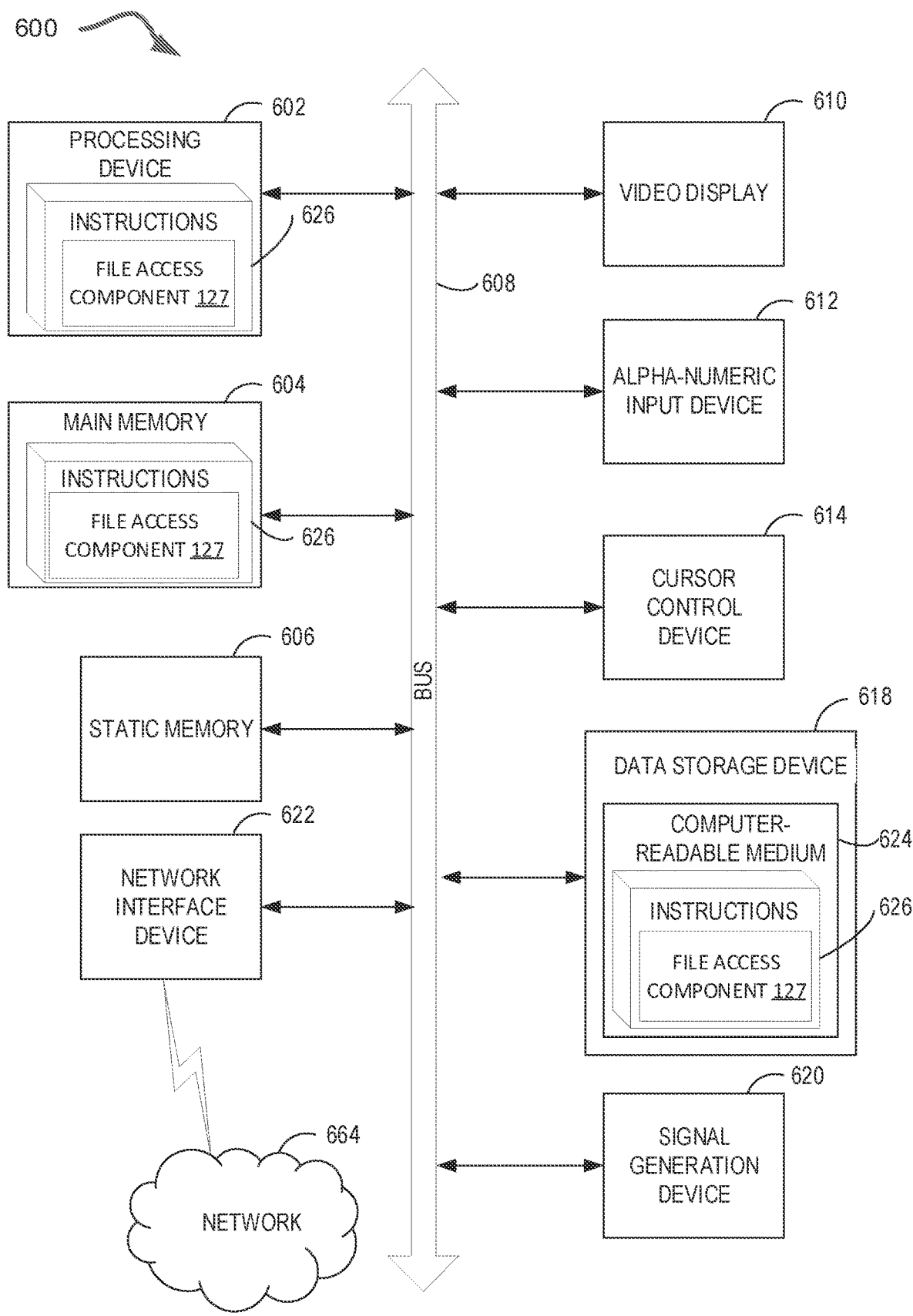
FIG. 6 depicts a block diagram of an illustrative computing device operating in accordance with one or more implementations of the present disclosure.

FIG. 6 depicts a block diagram of a computer system operating in accordance with one or more aspects of the disclosure. In various illustrative examples, computer system 600 can correspond to computer system 100 of FIG. 1. The computer system 600 can be included within a data center that supports virtualization. Virtualization within a data center results in a physical system being virtualized using VMs and/or containerized applications to consolidate the data center infrastructure and increase operational efficiencies. A VM can be a program-based emulation of computer hardware. For example, the VM can operate based on computer architecture and functions of computer hardware resources associated with hard disks or other such memory. The VM can emulate a physical computing environment, but requests for a hard disk or memory can be managed by a virtualization layer of a host system to translate these requests to the underlying physical computing hardware resources. This type of virtualization results in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 608. Computer system 600 also can include a video display unit 610 (e.g., an LCD), an alphanumeric input device 612 (e.g., a keyboard), a cursor control device 614 (e.g., a mouse), and a signal generation device 616.

Data storage device 618 can include a non-transitory computer-readable storage medium 624 on which can store instructions 626 embodying any one or more of the methodologies or functions described herein (e.g., file access component 127 of FIG. 1, and methods 200 and 300 of FIGS. 2 and 3, respectively). Instructions 626 can also reside, completely or partially, within volatile memory 604 and/or within processing device 602 during execution thereof by computer system 600, hence, volatile memory 604 and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 200, and 300, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    receiving, by a virtual machine (VM), a request to perform a file access operation with respect to a file;
    determining, by the VM, a hash value corresponding to a content of the file;
    searching, in a host file system of a host computer system, the file identified by the hash value by searching for the hash value in a first hash-to-content (HTC) table stored in the host file system;
    responsive to failing to find file identified by the hash value in the host file system, searching, in a guest file system of the VM, the file identified by the hash value by searching for the hash value in a second HTC table stored in the guest file system, wherein each HTC table comprises a plurality of records, and each of the plurality of records maps a particular hash value to a corresponding content location; and
    responsive to finding the file identified by the hash value in the guest file system, performing the file access operation with respect to the file.

2. The method of claim 1, further comprising:
    responsive to finding the file identified by the hash value in the host file system, performing the file access operation with respect to the file.

3. The method of claim 1, wherein determining, by the VM, the hash value corresponding to the content of the file includes referencing a guest identifier-to-hash (ITH) table stored in the guest file system of the VM, wherein the ITH table comprises a plurality of records, each record mapping an identifier of the file to a corresponding hash value.

4. The method of claim 1, further comprising:
    storing a plurality of files in the host file system on a physical storage device of the host computer system; and
    indexing the plurality of files by a respective content hash of a content of each file of the plurality of files.

5. The method of claim 1, further comprising:
    providing, by a hypervisor, access for the VM to a portion of the host file system, wherein the portion of the host file system comprises at least one ITH table and at least one HTC table.

6. The method of claim 1, further comprising:
    adding an entry in an HTC table stored in the host file system for each new file to which more than one VM has access.

7. A system comprising:
    a memory;
    a processing device operatively coupled to the memory, the processing device configured to:
        receive, via a virtual machine (VM), a request to perform a file access operation with respect to a file;
        determine a hash value corresponding to a content of the file;
        search, in a host file system of a host computer system, the file identified by the hash value by searching for the hash value in a first hash-to-content (HTC) table stored in the host file system;

responsive to failing to find file identified by the hash value in the host file system, search, in a guest file system of the VM, the file identified by the hash value by searching for the hash value in a second HTC table stored in the guest file system, wherein each HTC table comprises a plurality of records, and each of the plurality of records maps a particular hash value to a corresponding content location; and responsive to finding the file identified by the hash value in the guest file system perform the file access operation with respect to the file.

8. The system of claim 7, wherein the processing device is further to:

responsive to finding the file identified by the hash value in the host file system, perform the file access operation with respect to the file.

9. The system of claim 7, wherein determining the hash value corresponding to the content of the file includes referencing a guest identifier-to-hash (ITH) table stored in the guest file system of the VM, wherein the ITH table comprises a plurality of records, each record mapping an identifier of the file to a corresponding hash value.

10. The system of claim 7, wherein the processing device is further to:

store a plurality of files in the host file system on a physical storage device of the host computer system; and index the plurality of files by a respective content hash of a content of each file of the plurality of files.

11. The system of claim 7, wherein the processing device is further to:

provide, via a hypervisor, access for the VM to a portion of the host file system, wherein the portion of the host file system comprises at least one ITH table and at least one HTC table.

12. The system of claim 7, wherein the processing device is further to:

add an entry in an first HTC table stored in the host file system for each new file to which more than one VM has access.

13. A non-transitory computer-readable media storing instructions that, when executed, cause a processing device to:

receive, via a virtual machine (VM), a request to perform a file access operation with respect to a file;

determine a hash value to a content of the file;

search, in a host file system of a host computer system, the file identified by the hash value by searching for the hash value in a first hash-to-content (HTC) table stored in the host file system;

responsive to failing to find the file identified by the hash value in the host file system, search, in a guest file system of the VM, the file identified by the hash value by searching for the hash value in a second HTC table stored in the guest file system, wherein each HTC table comprises a plurality of records, and each of the plurality of records maps a particular hash value to a corresponding content location; and responsive to finding the file identified by the hash value in the guest file system perform the file access operation with respect to the file.

14. The non-transitory computer-readable media of claim 13, wherein the instructions further cause the processing device to:

responsive to finding the file identified by the hash value in the host file system, perform the file access operation with respect to the file.

15. The non-transitory computer-readable media of claim 13, wherein determining the hash value corresponding to the content of the file includes referencing a guest identifier-to-hash (ITH) table stored in the guest file system of the VM, wherein the ITH table comprises a plurality of records, each record mapping an identifier of the file to a corresponding hash value.

16. The non-transitory computer-readable media of claim 13, wherein the instructions further cause the processing device to:

provide, via a hypervisor, access for the VM to a portion of the host file system, wherein the portion of the host file system comprises at least one ITH table and at least one HTC table.

17. The non-transitory computer-readable media of claim 13, wherein the instructions further cause the processing device to:

store a plurality of files in the host file system on a physical storage device of the host computer system;

index the plurality of files by a respective content hash of a content of each file of the plurality of files; and add an entry in a first HTC table stored in the host file system for each new file to which more than one VM has access.

* * * * *